Oct. 29, 1957 E. W. WHITTIER 2,811,699
TRANSFORMER
Filed Dec. 8, 1954 2 Sheets-Sheet 1
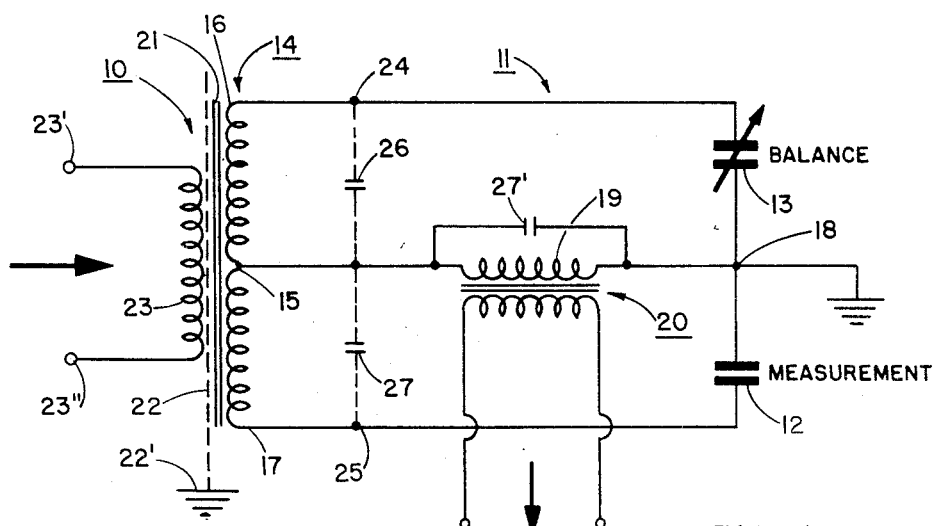
FIG. I
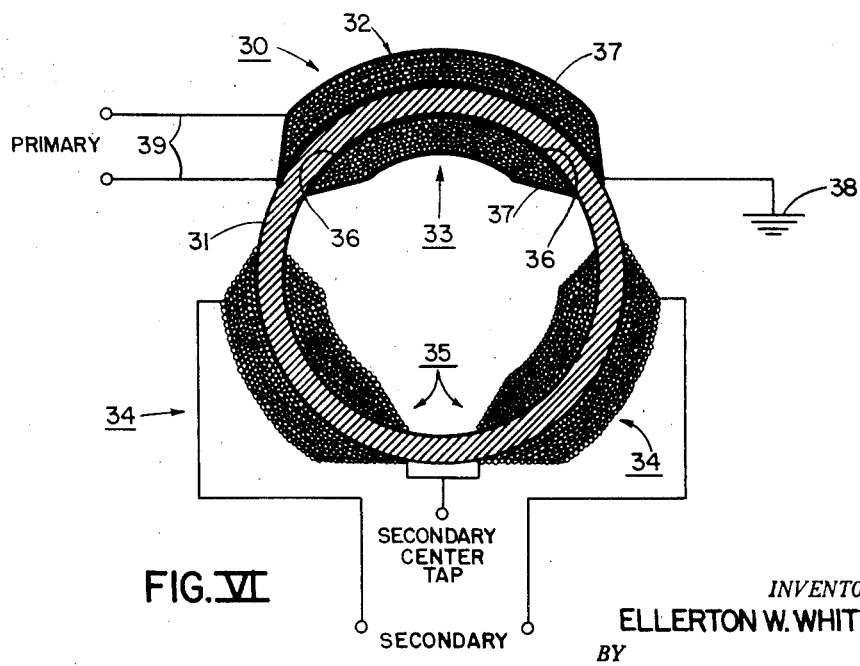
FIG. VI
INVENTOR.
ELLERTON W. WHITTIER
BY
Lawrence H. Poeton
AGENT

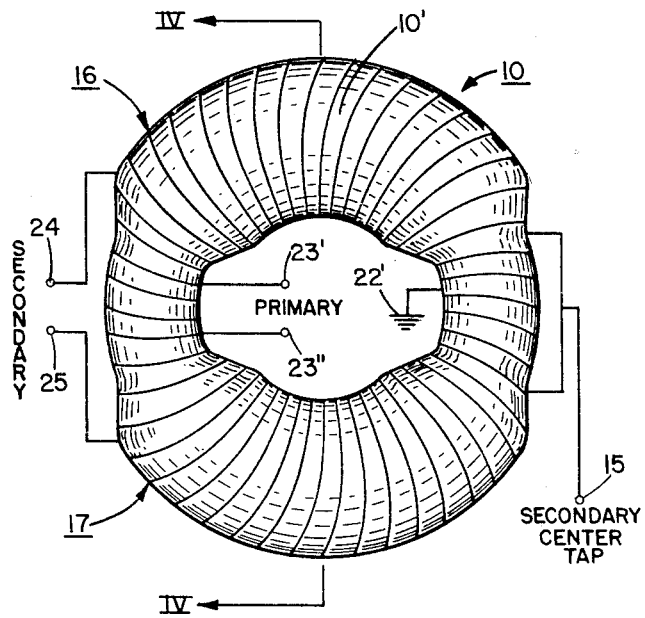
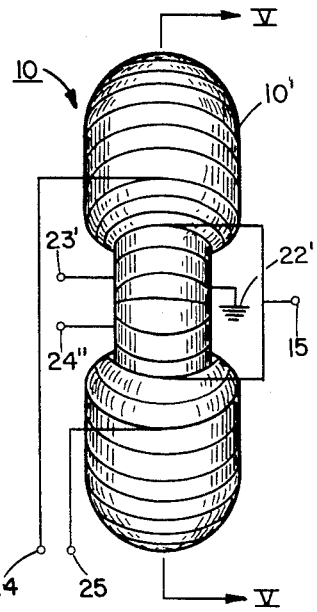
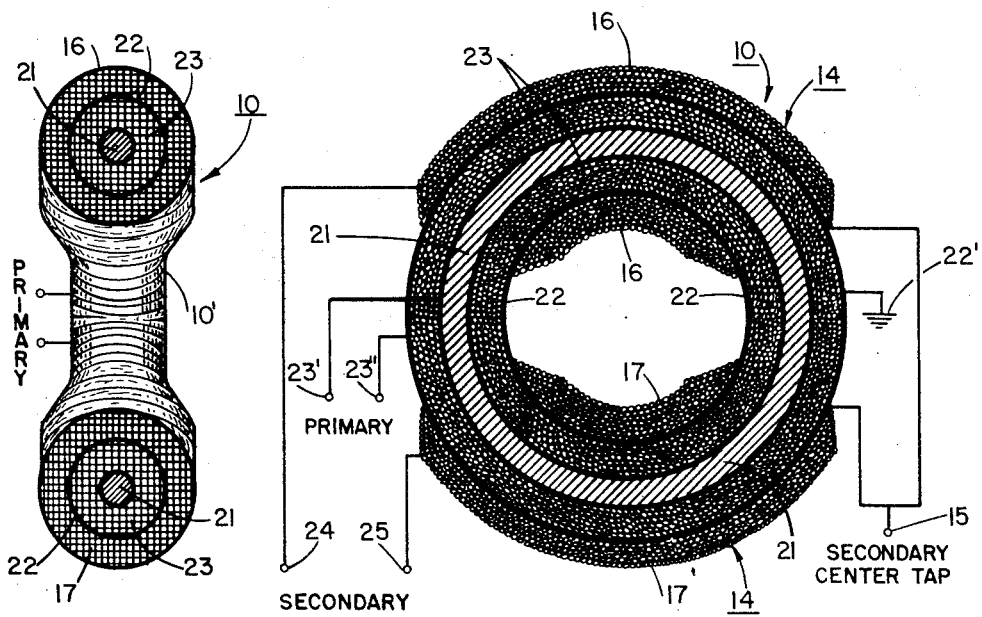

United States Patent Office 2,811,699
Patented Oct. 29, 1957

2,811,699

TRANSFORMER

Ellerton W. Whittier, Needham, Mass., assignor to The Foxboro Company, Foxboro, Mass., a corporation of Massachusetts Application December 8, 1954, Serial No. 473,966

3 Claims. (Cl. 336—69)

This invention relates to electrical transformers and has particular reference to the disposition of the windings thereof with respect to considerations of distributed capacity.

As an example, many transformers are provided with an intermediate or center tap on the secondary thereof. Such tapped secondary transformers have certain electrical characteristics, in that two secondary winding coils are defined by the tap connection of the secondary, and these two coils have certain numbers of turns, certain electrostatic capacities, etc., with respect to each other and in relation to circuitry with which the transformer is associated.

It is important in many instances that the coils of a transformer tapped secondary winding, as defined by the outer terminals and the tap connection, be electrically related to each other in a particular predetermined manner. The distributed capacity values and relations of such coils are important in many such structures and arrangements. If such capacity values are large, or undesirably related to each other, the result may be undesirable capacity effects in the circuitry which is operatively associated with the transformer.

For example, in industrial instrumentation, undesirable electrical capacity effects appear in transformer excited electrical bridge measuring circuits when conventional transformers are used, because the relatively large and unbalanced distributed capacities of the transformer secondary windings to a grounded electrostatic shield or to any other ground undesirably modify the effects of the bridge elements on the operation of the bridge.

The present invention provides a transformer with predetermined winding dispositions which provide special arrangements of distributed capacities to a ground. With these arrangements, distributed capacities to ground of the outer end terminals of a center tapped secondary winding are minimized and established in predetermined relation with each other. This is accomplished by providing the transformer secondary winding coils from the center tap to each of the outer end terminals with electrical symmetry with respect to each other, and by locating the outer end terminals thereof at substantial distances from ground.

As an embodiment of this invention such transformer secondary winding coils are provided with outer terminal distributed capacities to ground with values which are essentially equal and so low as to provide no effectively appreciable result with respect to the operation of the transformer in relation to the functioning of the circuitry associated therewith, even when the transformer is subjected to wide ambient temperature variations.

It is therefore, an object of this invention to provide a new and improved transformer.

Other objects and advantages of this invention will be in part apparent and in part pointed out hereinafter, and in the accompanying drawings wherein:

Figure I is a schematic showing of a balanceable electrical capacity measuring circuit with a center tapped transformer therein, as an illustrative use of a transformer according to this invention;

Figure II is an elevation of a toroidal transformer as an embodiment of this invention which may be used as the transformer in the circuit of Figure I;

Figure III is a side view of the transformer of Figure II;

Figure IV is a cross-section view of the transformer of Figure II, taken as on line IV—IV of Figure II;

Figure V is a cross-sectional view of the transformer of Figures II–IV taken on line V—V of Figure III; and Figure VI is a transverse cross-section, like that of Figure V, of another embodiment of this invention in the form of another toroidal transformer.

In Figure I, a transformer 10 is schematically shown in an electrical bridge circuit 11 as an illustrative use application of a transformer embodying the present invention. The bridge 11 is an electrical capacity measuring circuit which comprises a variable measuring condenser 12 in one arm of the bridge, a balancing condenser 13 in another arm of the bridge, and the transformer 10 through which the bridge circuit 11 is excited. The transformer 10 has a secondary winding 14 which is center tapped at 15 to provide a pair of coils 16 and 17 respectively as third and fourth arms of the bridge.

The bridge 11 is grounded at a bridge arm juncture 18 between the measuring and balancing condensers 12 and 13 and the transformer secondary center tap 15 is connected to the grounded juncture 18 through a primary winding 19 of an output transformer 20. The bridge exciting transformer 10 has an iron core 21 and is provided with an electrostatic shield 22 between a primary winding 23 terminaled at 23′ and 23″, and the secondary winding 14, as a means of preventing electrostatic coupling between the primary and secondary windings 23 and 14. The shield 22 is grounded at 22′ and the coupling between the primary and the secondary windings of the bridge exciting transformer 10 is thus purely electromagnetic and errors in the operation of the bridge circuit 11 due to electrostatic coupling in the bridge exciting transformer 10 are avoided.

The bridge exciting transformer 10 has, on its secondary winding 14, outer end terminals 24 and 25. Thus one secondary winding (16) extends from the center tap 15 to the end terminal 24, and the secondary winding 17 extends from the center tap 15 to the end terminal 25. The distributed capacities from the secondary winding end terminals 24 and 25 to ground are indicated by the dotted line condensers 26 and 27 respectively, as connected by dotted lines from the secondary winding outer end terminals 24 and 25 to the center tap (15) connection. Although the center tap 15 is connected to the bridge circuit ground terminal 18 through the primary winding 19 of the output transformer 20, a by-pass condenser 27′ connected around the primary winding 19 tends to place the center tap 15 essentially at ground potential as far as the distributed capacities 26 and 27 are concerned.

The circuit of Figure I illustrates the problem with which this invention deals, in that the distributed capacities 26 and 27 are each in parallel with at least some of the bridge elements. Such distributed capacities tend to cause zero drift in the bridge circuit under conditions of ambient temperature change, unless the distributed capacities are not appreciable. If the distributed capacities are appreciable, as in the case of the conventional transformer, the elements of the bridge must be closely balanced and matched with respect to each other in order to avoid zero drift. Such balancing and matching is impractical. To some extent appreciable distributed capacities may be balanced out, but the bridge circuit is limited in range and response characteristics by their presence.

On the other hand, when a bridge exciting transformer embodying this invention is used in the bridge circuit (Figure I), the distributed capacities 26 and 27 are minimized and equalized and have no operatively appreciable effect on the bridge circuit.

Figures II–V illustrate a toroidal transformer (item 10, Figure I) embodying this invention. This transformer has the advantage that it is substantially immune to pickup since external electrical influences are kept from the transformer core 21 by the primary and secondary windings 23, 14 and the shielding 22 of the toroidal transformer. Any suitable housing or mounting for the transformer can be used, as long as it does not increase the capacities 26 and 27.

This transformer (Figures II–V) has the core 21 in annular form (Figure V), with circular cross-section (Figure IV). The transformer primary winding 23 is wound on its core 21 throughout the annular extent thereof, with the usual sufficient insulation on the core 21 or the primary winding 23 wire, or both. The primary winding terminals are indicated at 23' and 23". This primary winding 23 starts at one point on the annular core 21 and from the terminal 23', and is closely wound around the core 21 so that the core is fully covered to the depth of several layers of the primary winding. The first layer is directly on the core, the second layer is on the first layer, and so forth, with the final layer ending in a connection to the terminal 23".

The primary winding 23 is fully covered by a wound layer 22 of material to form the electrostatic shield (Figure I, item 22) as a ground and as a means of preventing electrostatic coupling between the primary and secondary windings 23, 14, of the transformer 10. The electrostatic shield 22 may be made of brass, or of fabric tape which is treated with silver paint, or other similarly suitable material. As shown also in Figure I, the electrostatic shield 22 is grounded at 22'.

Again referring to Figures II–V, and particularly to Figure V, the transformer secondary winding 14 is wound on the electrostatic shield 22 in two parts to form the coils 16 and 17.

The transformer secondary winding 14 must be continuous and wound in the same direction throughout. Further, the coils 16 and 17 must be electrically symmetrical, and the outer end terminals 24, 25 must tie to the outer layers of the coils 16, 17 respectively, in order to provide the desired small and equal distributed capacities to ground (Figure I, 26, 27). To accomplish these results, each coil 16, 17, is wound from its center tap end to its respective outer end terminal 24, 25, and the starting ends are then joined at the center tap 15. The first winding layer of each coil is wound directly on, except for suitable insulation, and fully covering the electrostatic shield 22. The coils 16 and 17 must be formed by winding in opposite directions in order for the entire secondary winding, from outer terminal 24 to outer terminal 25, to be wound continuously in one direction.

The second winding layer of each coil 16, 17 is closely wound on the first layer thereof, and so forth until the final outer layer is wound. Thus the final layer is the most distant with respect to the shield 22 and the outer end terminals 24 and 25 have low distributed capacity (Figure I, 26, 27) to ground, i. e. to the Figure V grounded shield 22. The first layer of each coil has relatively high distributed capacity to ground since it is wound directly on the shield 22. In each coil, adjacent layers have capacity relations with respect to each other, so that the effect is one of a group of capacities in series. Consequently, as the voltage factor increases in successive winding layers moving away from the electrostatic shield, the capacity to the shield from each succeeding layer becomes less and less. Each winding layer is in effect a shield with respect to its outwardly succeeding winding layer. As shown in Figures II–IV, the transformer is provided with an outside layer 10' of tape as a protection against dirt, moisture and the like. This outside layer is not shown in Figure V.

The coil 16 is wound with wire to the same length and with the same number of turns as the wire with which the coil 17 is wound, and care is used to wind both coils with wire of the same material, dimension, and electrical characteristics. As a result the ohmic resistance of the coil 16 is close to being the same as the ohmic resistance of the coil 17. Further, the coils 16 and 17 as thus wound are physically closely similar so that they are balanced and matched physically as well as electrically. As a further feature, the coils 16 and 17 are wound with their ends tapered away from the grounded shield 22. This is accomplished by making the coil layers progressively shorter from the first to the last winding layer. Accordingly, with the end terminals 24 and 25 taken from the outermost layers at the coil ends most distant from the center tap 15, the air gap from the points of take-off from the coils to the shield 22 are greater than the direct distances therebetween. Thus the insulation is greater and the distributed capacity values less than if these air gaps and direct distances were allowed to be essentially equal by winding all of the coil layers to the same length.

The transformer secondary winding coils 16 and 17 therefore, with respect to each other, have the same starting point, i. e. the center tap 15, with the coil ends adjacent this point in relatively high capacity relation with the grounded shield 22. Also, the coils have their end terminals 24 and 25 at equal and relative low capacity relation with the grounded shield 22.

With a transformer according to this invention applied to a circuit such as that of Figure I, the distributed capacities 26 and 27 are equal and small, and have little appreciable operative effect on the circuit (11). Since the output of the circuit is taken from the transformer secondary center tap 15 and ground, the high distributed capacity from the center tap ends of the coils 16 and 17 to the electrostatic shield 22 is unimportant to the operation of the circuit which is kept in balanced or near balanced condition. When the bridge is balanced the potential across the output is zero, and therefore as far as the circuit output is concerned the effect of distributed capacity from the secondary coil ends at center tap 15 to ground is essentially zero. In the operation of such bridges the unbalance is relatively small, and the departure from zero potential across the output points is also small.

Thus, in the illustrative application of an embodiment of this invention as shown in Figure I, a balanceable bridge circuit is essentially freed of distributed capacity effects from a bridge exciting transformer.

Figure VI is an alternate structure embodying this invention, with loose transformer primary-secondary coupling which is desirable or sufficient in some forms of application, as compared to the tight coupling of the closely associated primary and secondary windings of the transformer of Figures II–V described above.

Figure VI transformer 30 is toroidal, with an annular core 31. A primary winding 32 is wound on an upper "third" 33 of the core 31, and a secondary winding 34 is wound on the lower "two-thirds" 35 of the core 31. On the upper "third" 33 of the core 31 an electrostatic shield 36 is wound directly on the core, with the primary winding 32 wound on the shield 36. A second electrostatic shield 37 is wound on the primary winding and grounded at 38. In this structure, with the secondary winding 34 wound directly on the core 31, the inner electrostatic shield 36 is necessary, to prevent primary to secondary electrostatic coupling through the core 31 itself.

In the Figure VI primary winding (32) structure it is important, also, to prevent electrostatic primary-secondary coupling by way of direct air gaps. As a means of facilitating full coverage of the primary winding by the second electrostatic shield 37 and in order to prevent such air gap coupling, the primary winding 32 is tapered at its ends, away from the core 31. That is, the primary winding layers are progressively shorter as they are further separated from the core 31. Thus the outer electrostatic shield 37, as wound on the primary winding 32, is tapered down to the core 31 at the ends of the primary winding, so that the two electrostatic shields 36 and 37 meet at the ends of the primary winding to form a single grounded shield arrangement which fully encloses the primary winding except for supply leads 39 thereto.

The Figure VI secondary winding 34 is wound directly on the annular core 31 except for suitable insulation therebetween. The structure and arrangement of this secondary winding is similar to that of the Figure V secondary winding 14. The Figure VI secondary is wound in the same manner, for like purposes, and with similar results, as that of Figure V. That is, the transformer of Figure VI may be used in the Figure I circuit as the bridge exciting transformer 10.

This invention, therefore, provides a new and improved transformer.

As many embodiments may be made of this invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. A toroidal electrical transformer comprising an annular core, a first electrostatic shield about one portion of said core, a primary winding about said one portion of said core, whereby said first electrostatic shield is physically and electrically between said primary winding and said core, said primary winding having a relatively long inner winding layer wound on said first electrostatic shield, a relatively short outer winding layer, and intermediate winding layers of such intermediate lengths as to provide tapered ends on said primary winding, a second electrostatic shield, about said primary winding and tapered down the ends thereof to said first electrostatic shield, whereby said primary winding is fully enclosed and shielded by the combination of said first and second electrostatic shields, a ground connection common to said shields, and a secondary winding also about said core, said secondary winding comprising a pair of electrically and physically matched coils connected at their adjacent ends to form a center tap on said secondary winding, one of said secondary coils being wound about a second portion of said core and the other of said secondary coils being wound about a third portion of said core, each of said coils having an inner winding layer which is wound directly on said core and which is connected to said center tap by said center tap forming connection, and each of said coils having an outer winding layer substantially removed from the said inner winding layer thereof and providing one of the outer end terminals of said secondary winding, with each of said outer end terminals of said secondary coils situated at the axially outermost point of its respective one of said outer winding layers, said secondary winding coils, further, each being formed with tapered ends wherein the winding layers are progressively shorter as said layers progress from the inner to the outer layers thereof, said outer end terminals having essentially equal and low distributed capacity relations to said electrostatic shield combination.

2. A toroidal electrical transformer comprising an annular core, a primary winding on and about said core, an electrostatic shield on and about said primary winding, and a secondary winding on and about said electrostatic shield, said secondary winding comprising a pair of electrically and physically matched coils each of which is wound on and about said electrostatic shield and which are connected at their adjacent ends to form a center tap of said secondary winding, each of said coils having an inner winding layer which is connected to said center tap by said center tap forming connection, and which is wound directly on and in high distributed capacity relation with said electrostatic shield, each of said coils having an outer winding layer providing one of the outer end terminals of said secondary winding, with each of said outer end terminals of said secondary coils situated at the axially outermost point of its respective one of said outer winding layers, said end terminals having essentially equal low distributed capacity relations to said electrostatic shield, and said secondary coils, further, each being formed in a configuration which is tapered away from said electrostatic shield as said coils progress from inner to outer layers thereof, whereby the air gap distance between said outer layer and said electrostatic shield is greater than the direct distance therebetween through the coil layers.

3. A toroidal electrical transformer wherein the secondary winding is in two parts with a center tap therebetween and wherein the distributed capacities of the two parts of the secondary winding are balanced against each other whereby the capacity effects in the output of the transformer are so minimized as to be negligible, said transformer comprising, in combination: a toroid core, a primary winding about said core, an electrostatic shield about said primary winding, and a center-tapped secondary winding also about said core and comprising a pair of electrically and physically matched coils with said secondary winding continuous in one direction throughout both of said matched coils, each of said matched coils having an inner winding layer and an outer winding layer, with said inner winding layers joined at their adjacent ends to form said center tap and said outer winding layers providing the outer end terminals of said secondary winding, each of said end terminals being at the opposite end of its respective coil in relation to the center tap end of said respective coil, with each of said outer end terminals of said secondary coils situated at the axially outermost point of its respective one of said outer winding layers, whereby the distributed capacities of said secondary winding coils are essentially balanced out between said coils because of said matched character of said coils and the consequent essentially equal positional and distance relations of said end terminals with respect to each other, with respect to said core, and with respect to said electrostatic shield.

References Cited in the file of this patent

UNITED STATES PATENTS

| | | |
|---|---|---|
| 1,223,947 | Ferrell | Apr. 24, 1917 |
| 1,340,027 | Dunham | May 11, 1920 |
| 1,352,360 | Dwyer | Sept. 7, 1920 |
| 2,277,775 | Mueller | Mar. 31, 1942 |

FOREIGN PATENTS

| | | |
|---|---|---|
| 208,776 | Switzerland | Feb. 29, 1940 |
| 148,172 | Australia | Sept. 11, 1952 |